United States Patent
Park et al.

(10) Patent No.: US 12,491,636 B2
(45) Date of Patent: Dec. 9, 2025

(54) COLLABORATIVE ROBOT HAVING COLLISION DETECTION FUNCTION AND COLLISION DETECTION METHOD OF COOPERATIVE ROBOT

(71) Applicant: NEUROMEKA CO., LTD., Seoul (KR)

(72) Inventors: Jong Hoon Park, Namyangju-si (KR); Young Jin Heo, Seoul (KR)

(73) Assignee: NEUROMEKA CO., LTD., Seoul (KR)

( * ) Notice: Subject to any disclaimer, the term of this patent is extended or adjusted under 35 U.S.C. 154(b) by 128 days.

(21) Appl. No.: 18/563,651

(22) PCT Filed: May 24, 2022

(86) PCT No.: PCT/KR2022/007365
§ 371 (c)(1),
(2) Date: Nov. 22, 2023

(87) PCT Pub. No.: WO2022/250423
PCT Pub. Date: Dec. 1, 2022

(65) Prior Publication Data
US 2024/0286285 A1    Aug. 29, 2024

(30) Foreign Application Priority Data
May 26, 2021   (KR) .................. 10-2021-0067776

(51) Int. Cl.
*B25J 9/16*     (2006.01)
*B25J 5/02*     (2006.01)
(Continued)

(52) U.S. Cl.
CPC ........... *B25J 9/1666* (2013.01); *B25J 9/1607* (2013.01)

(58) Field of Classification Search
None
See application file for complete search history.

(56) References Cited

U.S. PATENT DOCUMENTS 10,442,080 B2 * 10/2019 Muneto .................. B25J 9/1605
2013/0158709 A1    6/2013 Shi et al.
(Continued)

FOREIGN PATENT DOCUMENTS

DE    10 2014 207 275 A1    10/2015
EP         3 808 516 A1      4/2021
(Continued)

OTHER PUBLICATIONS

English machine translation JPH01135491A (Year: 2025).*
(Continued)

*Primary Examiner* — Jason Holloway
*Assistant Examiner* — Atticus A Cameron (57) ABSTRACT

The present invention provides a collaborative robot comprising: a main body robot; an additional shaft robot that moves the main body robot along the additional shaft; and a processor unit that transmits and receives signals to and from the main body robot and the additional shaft robot, wherein the processor unit comprises: a receiving unit that obtains a data signal from the main body robot and the additional shaft robot; an external force calculation unit that calculates an external force value using the obtained data signal as a variable; a collision determination unit that compares the calculated external force value with a predetermined collision detection boundary value so as to determine whether a collision has occurred; and a control unit that generates different control commands for the main body robot and the auxiliary shaft robot depending on whether a collision has occurred.

12 Claims, 5 Drawing Sheets

(51) Int. Cl.
  *B25J 9/00*   (2006.01)
  *B25J 9/04*   (2006.01)
  *B25J 13/08*  (2006.01)
  *B25J 19/06*  (2006.01)

(56) References Cited

U.S. PATENT DOCUMENTS

2015/0114165 A1   4/2015   Lauzier et al.
2017/0305015 A1   10/2017  Krasny et al.
2020/0030992 A1   1/2020   Motoyoshi et al.

FOREIGN PATENT DOCUMENTS

JP   H01135491       *  5/1989
KR   10-1010761 B1      1/2011
KR   10-2013-0041097 A  4/2013
KR   10-1844542 B1      4/2018
KR   10-2226122 B1      3/2021
WO   WO-2015158612 A1 * 10/2015 ............ B25J 13/085

OTHER PUBLICATIONS

English machine translation WO2015158612A1 (Year: 2025).*
The Extended European Search Report for European Patent Application No. 22811616.6, dated Apr. 24, 2025.

* cited by examiner

COLLABORATIVE ROBOT HAVING COLLISION DETECTION FUNCTION AND COLLISION DETECTION METHOD OF COOPERATIVE ROBOT

CROSS-REFERENCE TO RELATED APPLICATIONS

This application is the National Stage filing under 35 U.S.C. 371 of International Application No. PCT/KR2022/007365, filed on May 24, 2022, which claims the benefit of Korean Patent Application No. 10-2021-0067776, filed on May 26, 2021, the contents of which is all hereby incorporated by reference herein in its entirety.

TECHNICAL FIELD

The present disclosure relates to a collaborative robot having a collision detection function and a collision detection method of the collaborative robot and, more particularly, to a collaborative robot having a collision detection function for an additional shaft robot based only on the information on a main body robot without additional information on the additional shaft robot and a collision detection method of the collaborative robot.

BACKGROUND ART

A collaborative robot (COBOT) is a robot designed to interact with humans primarily in production sites, working with humans to perform tasks. While conventional industrial robots typically intend to replace human labor in the isolated workspaces within production sites, collaborative robots complement human efforts by working together with humans to increase work efficiency.

Recently, robotics-related technology for providing contactless services has been actively developed, and there is a growing interest in adopting collaborative robots in the restaurant industry, where robots may handle simple, repetitive, and dangerous tasks, allowing people to concentrate on providing services.

A 6-degree-of-freedom robot manipulator, classified as a collaborative robot, is equipped with a collision detection function and initiates an emergency stop if a collision with a worker is detected while performing precise position control. The collision detection function is essential for collaborative robots, allowing the robots to be installed without a fence and collaborate with human workers.

However, even if a commercial collaborative robot is used, the addition of an extra shaft to the robot to expand the robot's workspace may not guarantee safety of the entire robot system against collision if the additional shaft orthogonal robot lacks a collision detection function. Moreover, installing a separate device to provide a collision detection function for the additional shaft orthogonal robot may significantly hinders the productivity and economic viability of commercial collaborative robots.

DISCLOSURE

Technical Problem

An object of the present disclosure is to provide a collaborative robot having a collision detection function for an additional shaft based only on the information obtained through a main body robot without specific information on the additional shaft robot, such as position, torque, and speed, through setting of a collision detection boundary value; and a collision detection method of the collaborative robot.

Technical Solution

A collaborative robot having a collision detection function according to one embodiment of the present disclosure comprises a main body robot having a plurality of articulated arms; an additional shaft extending to have a predetermined length; an additional shaft robot that is installed to move linearly on the additional shaft and allows the main body robot to move along the additional shaft; and a processor unit transmitting and receiving signals to and from the main body robot and the additional shaft robot, wherein the processor unit comprises a receiving unit obtaining a data signal from the main body robot; an external force calculation unit calculating an external force value using the obtained data signal as a variable; a collision determination unit comparing the calculated external force value with a predetermined collision detection boundary value to determine whether a collision has occurred; and a control unit generating different control commands for the main body robot and the additional shaft robot depending on whether a collision has occurred.

According to one embodiment, the collision determination unit sets a plurality of modes that may be selected according to the status of the main body robot and the additional shaft robot, wherein different collision detection boundary values may be applied to the plurality of modes.

According to one embodiment, the collision determination unit sets a first collision detection boundary value applied to a first mode in which the main body robot is in an operating state and a second collision detection boundary value applied to a second mode in which the main body robot is in a stationary state and the additional shaft robot is in an operating state, where the second collision detection boundary value is different from the first collision detection boundary value.

According to one embodiment, the control unit generates an operation stop control command for the main body robot when a calculated external force value exceeds the first collision detection boundary value.

According to one embodiment, the control unit generates an operation stop control command for the additional shaft robot when a calculated external force value exceeds the second collision detection boundary value.

A collision detection method of a collaborative robot according to another embodiment of the present disclosure comprises receiving a signal acquiring a data signal; calculating an external force value calculating an external force value using the acquired data signal as a variable; determining the occurrence of a collision determining the occurrence of a collision by comparing the calculated external force value with a predetermined collision detection boundary value; and commanding control generating different control commands according to the occurrence of a collision.

According to one embodiment, the determining of the collision sets a plurality of modes that may be selected according to the status of the main body robot and the additional shaft robot, wherein different collision detection boundary values may be applied to the plurality of modes.

According to one embodiment, the determining of the collision sets a first collision detection boundary value applied to a first mode in which the main body robot is in an operating state and a second collision detection boundary value applied to a second mode in which the main body robot is in a stationary state and the additional shaft robot is in an operating state, where the second collision detection boundary value is different from the first collision detection boundary value.

Other specific details of the present disclosure are included in the detailed description and drawings.

Advantageous Effects

The embodiments of the present disclosure provides at least the following effects.

According to the various embodiments above, the collision detection function of a collaborative robot and a collision detection method according to the present disclosure may indirectly perform collision detection of an additional shaft robot using only the collision detection function of the main body robot without separately implementing a collision detection algorithm for the additional shaft robot.

Accordingly, additional cost for implementing a collision detection function is not required when an additional shaft robot is built for a collaborative robot, thereby improving economic efficiency and productivity.

The technical effects of the present disclosure are not limited to the technical effects described above, and other technical effects not mentioned herein may be understood to those skilled in the art to which the present disclosure belongs from the description below.

MODE FOR DISCLOSURE

The advantages and features of the present disclosure, and a method for achieving them will be clearly understood with reference to the embodiments described in detail together with appended drawings. However, the technical principles and spirit of the present disclosure are not limited to the embodiments disclosed below but may be implemented in various other forms; rather, the present embodiments are provided to make the present disclosure complete and inform those skilled in the art clearly of the technical scope of the present disclosure, and the technical principles and spirit of the present disclosure may be defined within the technical scope of the appended claims. Throughout the document, the same reference symbol refers to the same constituting element.

Also, the embodiments of the present disclosure will be described with reference to cross-sectional views and/or simplified drawings, which represent the ideal illustration of the present disclosure. Therefore, the structure of the illustration may be modified according to the employed manufacturing technology and/or tolerance error. Also, each constituting element of the corresponding drawing according to the present disclosure may have been magnified or reduced for the purpose of the description. In what follows, specific embodiments of the present disclosure will be described with reference to the accompanying drawings.

By referring to FIGS. 1 to 4, a collaborative robot having a collision detection function according to the embodiment of the present disclosure will be described in detail.

Figure 1:
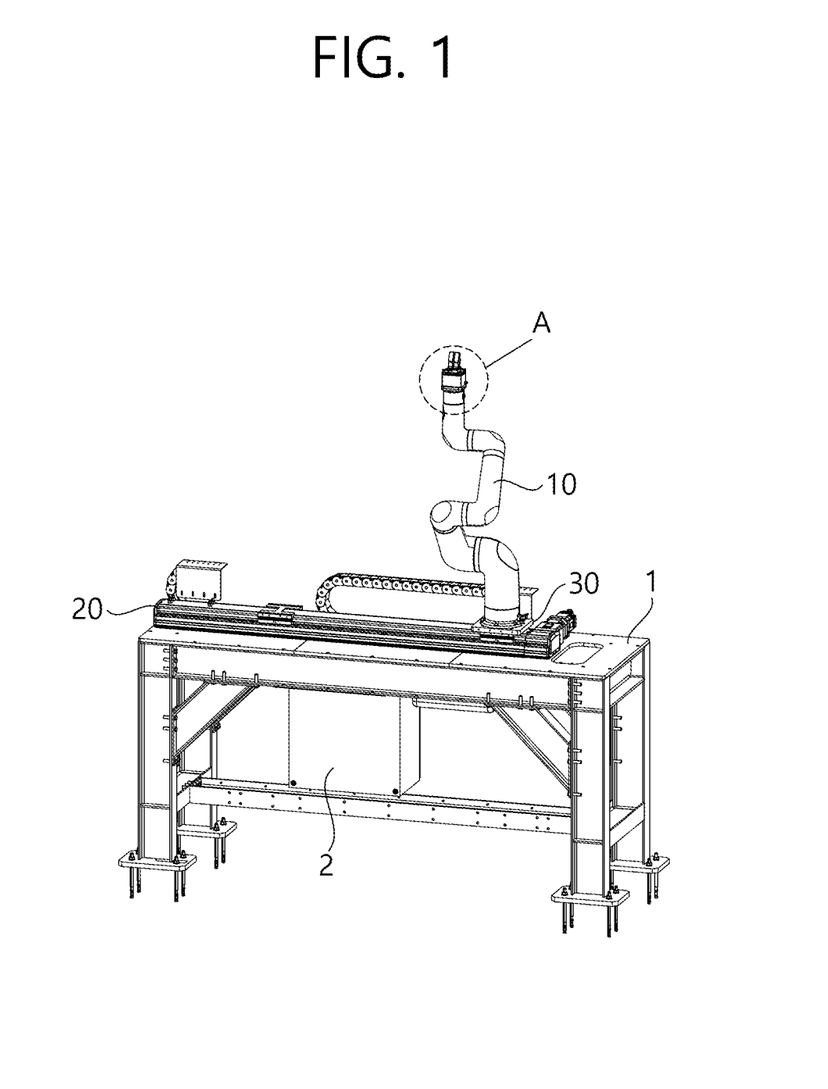
FIG. 1 is a perspective drawing of a collaborative robot having a collision detection function according to one embodiment of the present disclosure.
Figure 2:
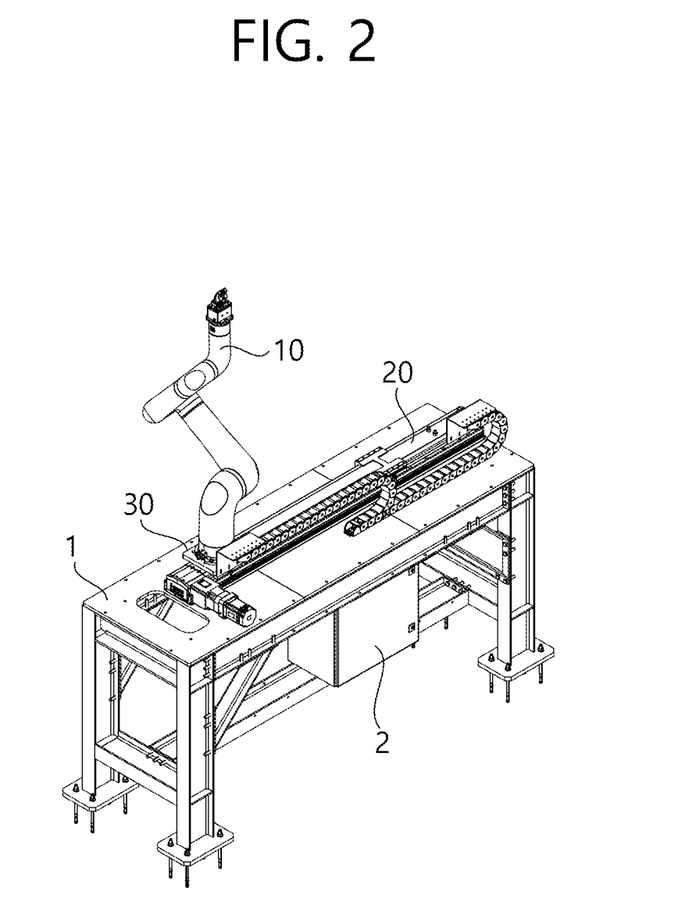
FIG. 2 is a perspective drawing of the collaborative robot having a collision detection function of FIG. 1, viewed from a different angle.

FIG. 1 is a perspective drawing of a collaborative robot having a collision detection function according to one embodiment of the present disclosure, and FIG. 2 is a perspective drawing of the collaborative robot having a collision detection function of FIG. 1, viewed from a different angle.

A collaborative robot having a collision detection function according to one embodiment of the present disclosure may comprise a main body robot 10 having a plurality of articulated arms; an additional shaft 20 extending to have a predetermined length; an additional shaft robot 30 that is installed to move linearly on the additional shaft 20 and allows the main body robot 10 to move along the additional shaft 20; and a processor unit 40 transmitting and receiving signals to and from the main body robot 10 and the additional shaft robot 30, which constitute the basic structure of the present disclosure.

The main body robot 10 has a plurality of articulated arms to realize a motion of multi-degrees of freedom, which form the hand body part of a collaborative robot to perform a motion. At this time, each joint comprising the articulated arm is equipped with an actuator that drives the joint to rotate, enabling the operations such as movement or tilting with respect to the corresponding axis.

As shown in the figure, an area (A) is formed at one end of the main body robot 10, where the gripper required for a given process is mounted. In other words, depending on the type of process employing the collaborative robot of the present disclosure, a gripper tailored to perform the given task may be selectively installed, and the area (A) may be formed for the attachment or detachment of the gripper when the task is changed, or the process is completed.

The other end of the main body robot 10 may be installed by being coupled to the additional shaft robot 30. Accordingly, the main body robot 10 may move together with the additional shaft robot 30, and as a result, the operating radius may be expanded along the longitudinal radius of the additional shaft formed by the additional shaft 20. In other words, the main body robot 10 may move within the movable range of one axis defined by the additional shaft 20 and perform work at the corresponding position.

As described above, the additional shaft 20 is additionally installed to expand the operating radius of the main body robot 10 and is extended to have a predetermined range of motion. For example, the additional shaft 20 may be formed in the horizontal or vertical direction on the upper surface of base 1 on which the collaborative robot is installed. In other words, being installed separately from the main body robot 10, the additional shaft 20 guides the main body robot 10, which performs a multi-degrees of freedom motion, to the area where linear motion may be executed additionally on one axis.

For example, as the main body robot 10, which is an articulated robot with 6 degrees of freedom, is installed on the additional shaft 20, the main body robot 10 is allowed to execute a motion based on the total of 7 axes formed by adding one axis to the existing axes of the main body robot 10. By using the method above, the additional shaft 20 may add a new single-axis movement to the main body robot 10 through simple and flexible installation.

The additional shaft robot 30 is installed to enable a linear movement along the additional shaft 20. In other words, the additional shaft robot 30 may move forward and backward along the straight axis within the range guided by the additional shaft 20. Also, the additional shaft robot 30 is designed to be mounted by being coupled with the main body robot 10 and may move the main body robot 10 by moving in tandem with the main body robot 10.

Meanwhile, the method by which the additional shaft robot 30 according to the present disclosure moves linearly on the additional shaft 20 is not particularly limited to a specific mechanism. For example, the additional shaft robot 30 may move linearly using a hydraulic method that receives power from a hydraulic motor installed on one side of the additional shaft 20. In another example, the additional shaft 20 may be installed in the form of a conveyor belt with a predetermined range of motion, and the additional shaft robot 30 placed on the upper surface of the conveyor belt may be moved.

The processor unit 40 is the software transmitting and receiving signals between the main body robot 10 and the additional shaft robot 30, which detects the occurrence of a collision of the main body robot 10 based on a received signal, generates a control command, and transmits the generated control command. For example, as shown in the figure, the processor unit 40 may be embedded in the controller 2 which is a hardware device installed for separate processing of information. Alternatively, the processor unit 40 may be embedded software in the main body robot 10 and/or additional shaft robot 30, respectively, and may be connected communicatively to enable transmission and reception of mutual signals.

Figure 3:
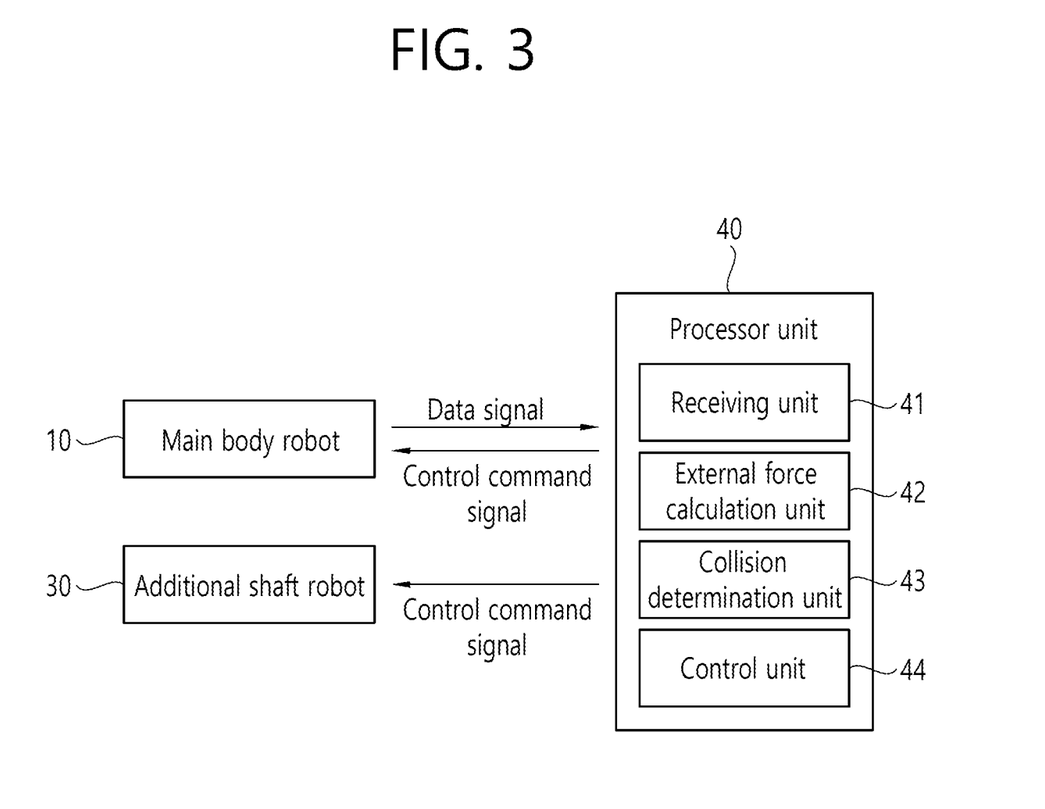
FIG. 3 illustrates a structure of a collaborative robot having a collision detection function according to one embodiment of the present disclosure.

The processor unit 40 according to one embodiment of the present disclosure may comprise a receiving unit 41 obtaining a data signal from the main body robot 10; an external force calculation unit 42 calculating an external force value using the obtained data signal as a variable; a collision determination unit 43 comparing the calculated external force value with a predetermined collision detection boundary value to determine whether a collision has occurred; and a control unit 44 generating different control commands for the main body robot 10 and the additional shaft robot 30 depending on whether a collision has occurred.

The processor unit 40 performs the role of controlling a safety stop of a collaborative robot by recognizing a collision occurred in the main body robot 10 and/or additional shaft robot 30. In what follows, more detailed descriptions will be provided with reference to FIGS. 3 and 4.

Figure 4:
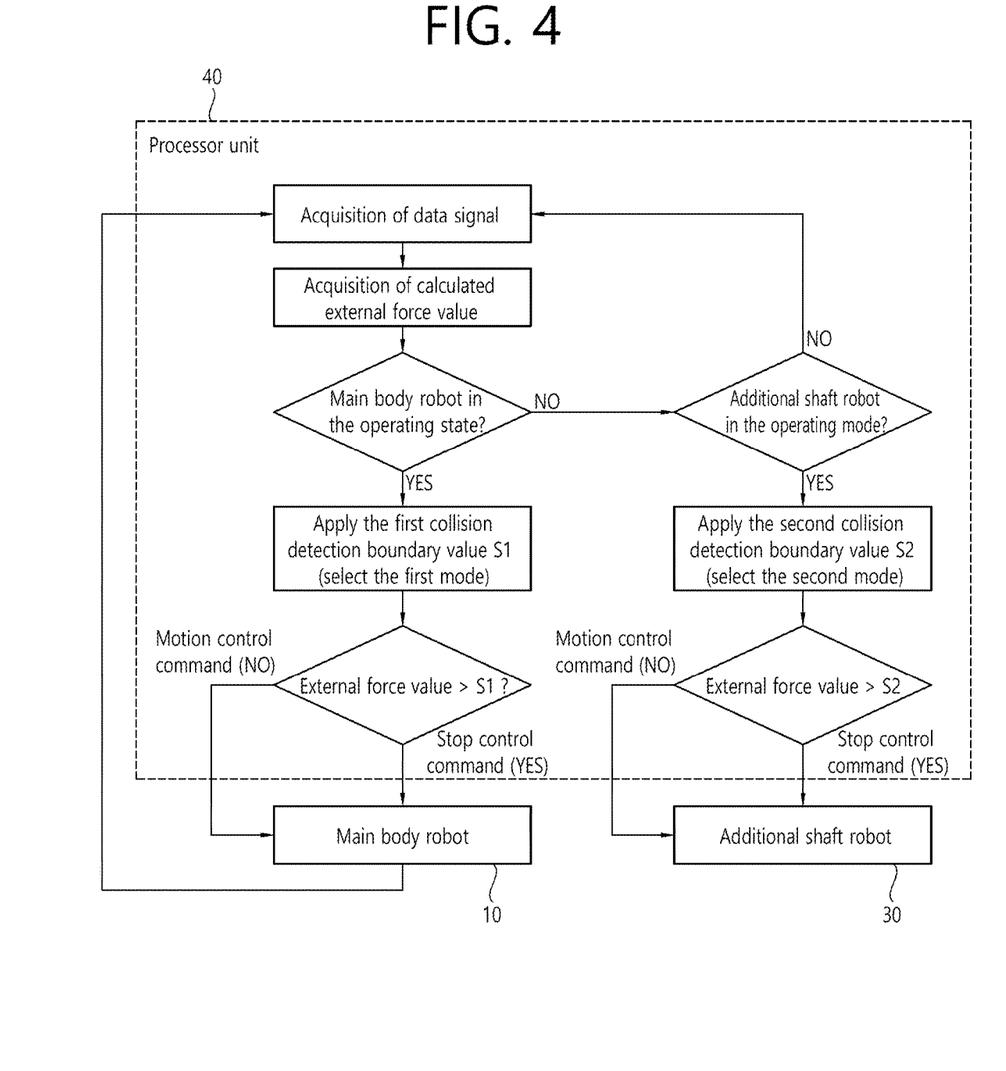
FIG. 4 is a block diagram illustrating the concept of a collision detection function according to one embodiment of the present disclosure.

FIG. 3 illustrates a structure of the processor unit 40 according to one embodiment of the present disclosure, and FIG. 4 is a block diagram illustrating the concept of a collision detection function according to one embodiment of the present disclosure.

The receiving unit 41 receives a signal by being communicatively connected to the main body robot 10, and the external force calculation unit 42 estimates an external force value required to collision detection based on the received signal. In other words, the processor unit contains an algorithm receiving a data signal and estimating an external force value by using the received signal as a variable.

At this time, the signal received by the receiving unit 41 may be a data signal of a joint torque sensor attached to the articulated arm of the main body robot 10 or a current data signal calculated by a dynamics-based observer, which is applied to each joint of the main body robot 10. Also, the received signal may be a single value or a plural value. At this time, all the plural values should be used as an index for estimating an external force value actually applied to the main body robot 10.

The collision determination unit 43 sets a collision detection boundary value for determining the occurrence of a collision of the main body robot 10. The collision determination unit 43 compares an estimated external force value with a predetermined collision detection boundary value, determines the occurrence of a collision when the estimated external force value exceeds the predetermined collision detection boundary value, and determines no occurrence of a collision when the estimated external force value does not exceed the predetermined collision detection boundary value.

At this time, the collision detection boundary value should be set appropriately so that an estimated external force value exceeds the collision detection boundary value when an actual collision occurs in the main body robot 10.

The collision determination unit 43 according to one embodiment of the present disclosure applies different collision detection boundary values according to the operation of the main body robot 10 and the additional shaft robot 30. In other words, since the collision detection boundary value, compared with the calculated external force value, is preconfigured to a different value according to the operation of the main body robot 10 or the operation of the additional shaft robot 30, various types of collision may be detected depending on the specific operating scenarios.

The collision determination unit 43 sets a plurality of modes which may be selected according to whether the main body robot 10 and the additional shaft robot 30 are in the operating or stationary state, where collision detection boundary values set differently are applied to the plurality of modes.

In other words, the collision determination mode that may be selected by the collision determination unit 43 may include a first mode and a second mode, which are different from each other. Also, the collision determination unit 43 may set a first collision detection boundary value S1 applied to a first mode and a second collision detection boundary value S2 applied to a second mode, which is smaller than the first collision detection boundary value S1.

The control unit 44 generates different control commands for the main body robot 10 and/or additional shaft robot 30 according to the occurrence of a collision. If the collision determination unit 43 determines that a collision has occurred due to the respective motions of the main body robot 10 or the additional shaft robot 30, the control unit 44 generates a safety stop control command to stop the main body robot 10 or the additional shaft robot 30 executing a task, respectively. On the other hand, if the collision determination unit 43 determines that a collision has not occurred from the respective motions of the main body robot 10 or the additional shaft robot 30, the control unit 44 generates a motion control command for the main body robot 10 or the additional shaft robot 30 to execute a task, respectively.

In other words, the processor unit determines whether a collision has occurred in the main body robot 10 based on the calculated external force value and embeds an algorithms generating different control commands according to the occurrence of a collision.

With reference to FIG. 4, a specific implementation according to one embodiment of the present disclosure will be described.

First, the collision determination unit 43 determines whether the main body robot 10 is in the operating state or stationary state. The operating state of the main body robot 10 refers to the state in which a multi-axis motion or tilt is generated using the articulated arm as a control torque is applied to the main body robot 10, indicating that the main body robot 10 is performing a task. Meanwhile, the stationary state of the main body robot 10 refers to the state in which no motion or tilt is generated as no control torque is applied to the main body robot 10, indicating that the main body robot 10 is not performing a task.

Afterward, the collision determination unit 43 may determine whether the additional shaft robot 30 is in the operating state or stationary state. The operating state of the additional shaft robot 30 refers to the state in which a forward or backward linear motion is generated along the additional shaft 20 as a control torque is applied to the additional shaft robot 30. Meanwhile, the stationary state of the additional shaft robot 30 refers to the state in which no linear motion is generated as no control torque is applied to the additional shaft robot 30.

The collision determination unit 43 according to one embodiment of the present disclosure may select a first mode when the main body robot 10 is in the operating state. The collision determination unit 43 selecting the first mode is compared with a calculated external force value obtained by applying the predetermined first collision detection boundary value S1. When the calculated external force value is greater than the first collision detection boundary value S1, it is determined that a collision has occurred to the main body robot 10; when the calculated external force value is less than the first collision detection boundary value S1, it is determined that no collision has occurred to the main body robot 10.

As described above, the collision determination unit 43 determines whether a collision occurs due to the motion of the main body robot 10 when the first mode is selected, and the determination result is shared with the control unit 44. When the occurrence of a collision is recognized, the control unit 44 blocks the control torque applied to the main body robot 10 by generating a safety stop control command for the main body robot 10. On the other hand, when no occurrence of a collision is recognized, the control unit 44 generates a motion control command for the main body robot 10 to apply a control torque to the main body robot 10.

Meanwhile, when the main body robot 10 is in the operating state and the additional shaft robot 30 is in the stationary state, there is no need to perform additional collision detection for the additional shaft robot 30. Moreover, even when the main body robot 10 is in the operating state and the additional shaft robot 30 is in the operating state, that is, even when both the main body robot 10 and the additional shaft robot 30 are controlled simultaneously, if a collision is properly detected for the main body robot 10, the safety stop control may be performed simultaneously for the main body robot 10 and the additional shaft robot 30.

The collision determination unit operating in the first mode may ensure the safety stop control function of the control unit 44 for the entire robot solely from the detection of a collision of the main body robot 10.

Accordingly, the collision determination unit 43 operating in the first mode according to one embodiment of the present disclosure may not determine the state of the additional shaft robot 30 but perform determination of the occurrence of a collision of the main body robot 10.

The collision determination unit 43 according to one embodiment of the present disclosure determines whether the additional shaft robot 30 is in the operating state or stationary state when the main body robot 10 is in the stationary state; when the additional shaft robot 30 is in the operating state, the second mode may be selected. The collision determination unit 43 selecting the second mode is compared with a calculated external force value obtained by applying the second collision detection boundary value S2.

At this time, the second collision detection boundary value S2 has a different value from the first collision detection boundary value S1 and may be set to indirectly detect a collision occurred from the movement of the additional shaft robot 30 using the calculated external force value from the main body robot 10.

Meanwhile, an external force for the collision due to the movement of the additional shaft robot 30 may be estimated to be more sensitive than the collision occurred when the main body robot 10 is in the stationary state because of the inertia of the main body robot 10. Therefore, the second collision detection boundary value S2 according to one embodiment of the present disclosure may be set to a value larger than the first collision detection boundary value S1 by considering the external force value estimated with more sensitivity.

As described above, the collision determination unit 43 determines the occurrence of a collision due to the movement of the additional shaft robot 30 as the second mode is selected, and the determination result is shared with the control unit 44. When it is determined that a collision is occurred, the control unit 44 prevents the application of control torque to the additional shaft robot 30 by generating a safety stop control command for the additional shaft robot 30. On the other hand, when it is determined that no collision is occurred, the control unit 44 generates a motion control command for the additional shaft robot 30 to apply a control torque to the main body robot 10.

In what follows, referring to FIG. 5, the collision detection method of a collaborative robot according to an embodiment of the present disclosure will be described in detail. Meanwhile, the collision detection method of a collaborative robot described below should be understood such that various embodiments of the collaborative robot having the collision detection function described above are applied in the same way, and repeated descriptions thereof will be omitted.

Figure 5:
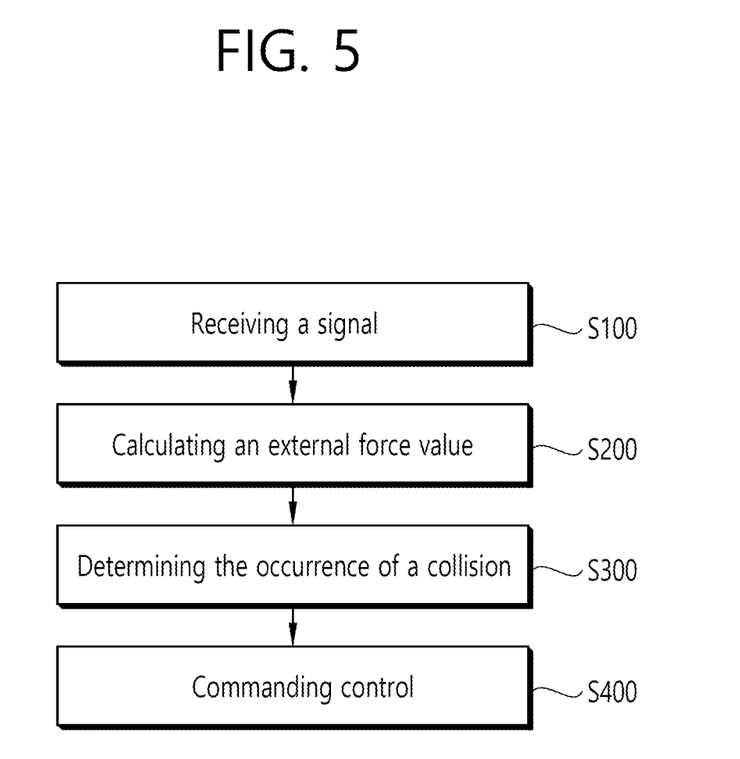
FIG. 5 is a flow diagram illustrating a collision detection method of a collaborative robot according to one embodiment of the present disclosure in temporal order.

FIG. 5 is a flow diagram illustrating a collision detection method of a collaborative robot according to one embodiment of the present disclosure in temporal order.

As shown in the figure, a collision detection method of a collaborative robot according to one embodiment of the present disclosure, intended for the additional shaft 20 to detect a collision of a collaborative robot for which the main body robot 10 and the additional shaft robot 30 are installed, may comprise receiving a signal acquiring a data signal; calculating an external force value calculating an external force value using the acquired data signal as a variable; determining the occurrence of a collision determining the occurrence of a collision by comparing the calculated external force value with a predetermined collision detection boundary value; and commanding control generating different control commands according to the occurrence of a collision.

The receiving of the signal receives a data signal from the main body robot 10, and then the calculating of the external force value estimates an external force required to detect a collision based on the received signal.

At this time, the received signal may be a data signal of a joint torque sensor attached to the articulated arm of the main body robot 10 or a current data signal calculated by a dynamics-based observer, which is applied to each joint of the main body robot 10. Also, the received signal may be a single value or a plural value. At this time, all the plural values should be used as an index for estimating an external force value actually applied to the main body robot 10.

The determining of the occurrence of a collision compares an estimated external force value with a predetermined collision detection boundary value to determine whether a collision is occurred. In other words, it is determined that a collision is occurred when the estimated external force value exceeds the predetermined collision detection boundary value, and it is determined that no collision is occurred when the estimated external force value does not exceed the predetermined collision detection boundary value.

The determining of the occurrence of a collision according to one embodiment of the present disclosure selects a plurality of modes according to the status of the main body robot 10 and the additional shaft robot 30, where collision detection boundary values set differently may be applied to the plurality of modes.

Also, the determining of the occurrence of a collision according to one embodiment of the present disclosure may set the first collision detection boundary value S1 applied to the first mode and the second collision detection boundary value S2 applied to the second mode, which is different from the first collision detection boundary value S1.

More specifically, first, whether the main body robot 10 is in the operating state or stationary state is determined. When the main body robot 10 is in the operating state, the first mode is selected, and the occurrence of a collision due to the movement of the main body robot 10 is determined through comparison with the external force value calculated by applying the predetermined first collision detection boundary value S1.

Afterward, whether the additional shaft robot 30 is in the operating state or stationary state is determined. More specifically, when the main body robot 10 is in the stationary state, it is determined whether the additional shaft robot 30 is in the operating state or stationary state; when the additional shaft robot 30 is in the operating state, the second mode may be selected. The occurrence of a collision due to the movement of the additional shaft robot 30 is determined through comparison with the external force value calculated by applying the predetermined second collision detection boundary value S2.

The commanding control 44 generates different control commands for the main body robot 10 and/or additional shaft robot 30 according to the occurrence of a collision. If it is determined that a collision has occurred due to the respective motions of the main body robot 10 or the additional shaft robot 30, a safety stop control command to stop the main body robot 10 or the additional shaft robot 30 executing a task is generated, respectively. On the other hand, if it is determined that a collision has not occurred from the respective motions of the main body robot 10 or the additional shaft robot 30, a motion control command for the main body robot 10 or the additional shaft robot 30 to execute a task is generated, respectively.

According to the various embodiments described above, the collision detection function of a collaborative robot and a collision detection method according to the present disclosure may indirectly perform collision detection of the additional shaft robot 30 using only the collision detection function of the main body robot 10 without separately implementing a collision detection algorithm for the additional shaft robot 30.

Accordingly, additional cost for implementing a collision detection function is not required when the additional shaft robot 30 is built for a collaborative robot, thereby improving economic efficiency and productivity.

As described above, it is apparent for those skilled in the art that the present disclosure may be embodied in other specific forms without changing the technical principles or essential characteristics of the present disclosure. Therefore, the embodiments described above should be regarded as being illustrative rather than restrictive in every aspect. The technical scope of the present disclosure should be determined by the appended claims given below rather than the detailed descriptions above, and it should be understood that the implications and scope of the appended claims and all of the modifications or modified forms that are derived from an equivalent concept of the present disclosure belong to the technical scope of the present disclosure.

[National Research and Development Project that Supports the Present Disclosure]

Project unique number: 1415174184
Project number: 20014398
Ministry name: Ministry of Trade, Industry and Energy
Name of (professional) project management organization: Korea Planning & Evaluation Institute of Industrial Technology
Research program name: Industrial technology innovation project (Industrial core technology development project-pan-ministerial cooperation robot product technology)
Research project name: Development of a kinematically versatile easy to use safety supported AI-integrable and high speed (>5 kHz) robot controller
Contribution ratio: 1/1
Name of project leading organization: Neuromeka Co., Ltd.
Project period: 2021.04.01~ 2024.12.31

The invention claimed is:

1. A collaborative robot having a collision detection function comprising:
   a main body robot having a plurality of articulated arms;
   an additional shaft extending to have a predetermined length;
   an additional shaft robot that is installed to move linearly on the additional shaft and allows the main body robot to move along the additional shaft; and
   a processor unit transmitting and receiving signals to and from the main body robot and the additional shaft robot,
   wherein the processor unit comprises:
   a receiving unit obtaining a data signal from the main body robot;
   an external force calculation unit calculating an external force value using the obtained data signal as a variable; and
   a collision determination unit comparing the calculated external force value with a predetermined collision detection boundary value to determine whether a collision has occurred,
   wherein the predetermined collision detection boundary value includes:
   a first collision detection boundary value applied to a first mode in which the main body robot is in an operating state; and
   a second collision detection boundary value applied to a second mode in which the main body robot is in a stationary state and the additional shaft robot is in an operating state, and
   wherein the second collision detection boundary value is different from the first collision detection boundary value.

2. The robot of claim 1, wherein the processor unit further comprises a control unit generating control commands for the main body robot, or the additional shaft robot, or both, depending on whether a collision has occurred, and
wherein the control unit generates an operation stop control command for the main body robot when an external force value calculated in the first mode exceeds the first collision detection boundary value.

3. The robot of claim 1, wherein the processor unit further comprises a control unit generating control commands for the main body robot, or the additional shaft robot, or both, depending on whether a collision has occurred, and
wherein the control unit generates an operation stop control command for the additional shaft robot when an external force value calculated in the second mode exceeds the second collision detection boundary value.

4. A collision detection method of a collaborative robot including a main body robot and an additional shaft robot, the method comprising:
receiving a signal acquiring a data signal;
calculating an external force value using the acquired data signal as a variable; and
determining an occurrence of a collision by comparing the calculated external force value with a predetermined collision detection boundary value,
wherein the predetermined collision detection boundary value includes:
a first collision detection boundary value applied to a first mode in which the main body robot is in an operating state; and
a second collision detection boundary value applied to a second mode in which the main body robot is in a stationary state and the additional shaft robot is in an operating state, and
wherein the second collision detection boundary value is different from the first collision detection boundary value.

5. The method of claim 4, further comprising generating control commands for the main body robot, or the additional shaft robot, or both, depending on whether a collision has occurred,
wherein generating the control commands includes generating an operation stop control command for the main body robot when an external force value calculated in the first mode exceeds the first collision detection boundary value.

6. The method of claim 4, further comprising generating control commands for the main body robot, or the additional shaft robot, or both, depending on whether a collision has occurred, and
wherein generating the control commands includes generating an operation stop control command for the main body robot and the additional shaft robot when an external force value calculated in the first mode exceeds the first collision detection boundary value.

7. The method of claim 4, further comprising generating control commands for the main body robot, or the additional shaft robot, or both, depending on whether a collision has occurred, and
wherein generating the control commands includes generating an operation stop control command for the additional shaft robot when an external force value calculated in the second mode exceeds the second collision detection boundary value.

8. The method of claim 4, wherein the second collision detection boundary value is smaller than the first collision detection boundary value.

9. The method of claim 4, wherein the second collision detection boundary value is larger than the first collision detection boundary value.

10. The robot of claim 1, wherein the processor unit further comprises a control unit generating control commands for the main body robot, or the additional shaft robot, or both, depending on whether a collision has occurred, and
wherein the control unit generates an operation stop control command for the main body robot and the additional shaft robot when an external force value calculated in the first mode exceeds the first collision detection boundary value.

11. The robot of claim 1, wherein the second collision detection boundary value is smaller than the first collision detection boundary value.

12. The robot of claim 1, wherein the second collision detection boundary value is larger than the first collision detection boundary value.

* * * * *